United States Patent [19]

Märker et al.

[11] 4,360,496
[45] Nov. 23, 1982

[54] COOLING SYSTEM FOR AUXILIARY SYSTEMS OF A NUCLEAR INSTALLATION

[75] Inventors: Wolfgang Märker, Heroldsbach; Klaus Müller, Röttenbach; Wilhelm Roller, Erlangen, all of Fed. Rep. of Germany

[73] Assignee: Kraftwerk Union Aktiengesellschaft, Mülheim, Fed. Rep. of Germany

[21] Appl. No.: 162,062

[22] Filed: Jun. 23, 1980

[30] Foreign Application Priority Data

Jul. 6, 1979 [DE] Fed. Rep. of Germany ....... 2927418

[51] Int. Cl.³ .............................................. G21C 9/00
[52] U.S. Cl. .................................... 376/298; 376/391; 376/405
[58] Field of Search .................. 176/44, 50, 64, 65; 376/298, 391, 402, 405

[56] References Cited

U.S. PATENT DOCUMENTS

| | | | |
|---|---|---|---|
| 3,660,229 | 5/1972 | Klingbeil | 176/65 |
| 4,093,514 | 6/1978 | Iljunin | 176/65 |
| 4,104,119 | 8/1978 | Schilling | 176/65 |
| 4,113,561 | 9/1978 | Fidler | 176/65 |

*Primary Examiner*—Donald P. Walsh
*Attorney, Agent, or Firm*—Herbert L. Lerner

[57] ABSTRACT

Cooling system for auxiliary systems of a nuclear installation for heat removal from heat exchangers, the heat exchangers being connected on the primary side thereof to lines which may contain radioactive liquids or gases, being disposed in a secured area of the nuclear installation, and having connections on the secondary side thereof for cooling liquid lines, including an outgoing line for the cooling liquid connected to the connections on the secondary side of the heat exchangers, a dry cooling tower having cooling elements connected to the outgoing line, a return line for the cooling liquid connected to the cooling elements, a refrigeration loop having a supplemental heat exchanger with the primary side thereof connected in the return line, a bypass line connected from the outgoing to the return line parallel to the cooling elements and supplemental heat exchanger, and a control valve connected in the bypass line.

4 Claims, 1 Drawing Figure

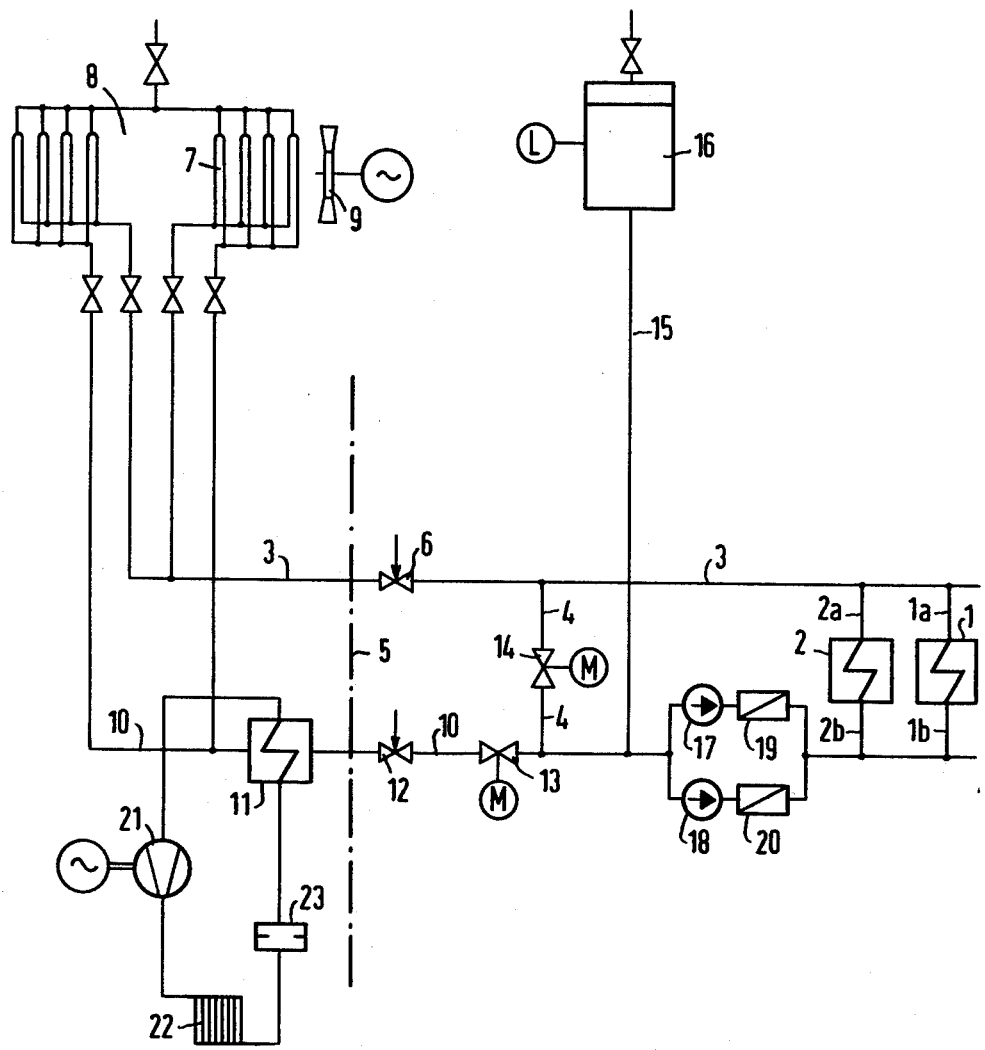

COOLING SYSTEM FOR AUXILIARY SYSTEMS OF A NUCLEAR INSTALLATION

The invention relates to a cooling system for auxiliary systems of a nuclear installation for the removal of heat from heat exchangers which, firstly are connected on the primary side to lines which may contain radioactive liquids or gases; secondly are disposed in a secured area of the nuclear installation; and thirdly have connections on the secondary side thereof for cooling-liquid lines.

For many of these systems it must be ensured that a given temperature (for instance 30° C.) of the cooling liquid provided for the removal of heat from these auxiliary systems is maintained in operation. In addition, the temperature of the cooling liquid must not drop too far so that material stresses in the heat exchangers for the removal of heat from the auxiliary systems are kept low.

The cooling system must furthermore be constructed so that even in the event of a failure of the power supply from the normal network, heat removal from the auxiliary systems is still assured.

These three requirements have not generally been met in such cooling systems in the past.

It is accordingly an object of the invention to provide a cooling system for auxiliary systems of a nuclear installation which overcomes the hereinafore-mentioned shortcomings of the heretofore-known devices of this general type, and which meets all three of these requirements without the need of having to provide a supplemental water line or supply basin.

With the foregoing and other objects in view there is provided, in accordance with the invention, a cooling system for auxiliary systems of a nuclear installation for heat removal from heat exchangers, the heat exchangers being connected on the primary side thereof to lines which may contain radioactive liquids or gases, being disposed in a secured area of the nuclear installation, and having connections on the secondary side thereof for cooling liquid lines, comprising an outgoing line for the cooling liquid connected to the connection on the secondary side of the heat exchangers, a dry cooling tower having cooling elements connected to the outgoing line, a return line for the cooling liquid connected to the cooling elements, a refrigeration loop (compressor, condenser and throttle point) having a supplemental heat exchanger with the primary side thereof connected in the return line, a bypass line connected from the outgoing to the return line parallel to the cooling elements and supplemental heat exchanger, and a control valve connected in the bypass line.

In accordance with another feature of the invention, the secured area has a boundary, and there is provided a fast-acting shut off valve connected in each of the outgoing and return lines at the boundary.

In accordance with a further feature of the invention, there is provided a rising line connected to the return line in the secured area, and an expansion tank being connected to the rising line and disposed in the secured area.

In accordance with an added feature of the invention, the cooling liquid is an antifreeze medium which ensures unrestrained operation of the dry cooling tower for safe heat removal from the nuclear installation.

In accordance with a concomitant feature of the invention, a plurality of redundant cooling systems are provided for one nuclear installation, the dry cooling towers of the individual cooling systems being disposed at different locations.

Other features which are considered as characteristic for the invention are set forth in the appended claims.

Although the invention is illustrated and described herein as embodied in a cooling system for auxiliary systems of a nuclear installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a diagrammatic view of the cooling system of the invention.

Referring now particularly to the single FIGURE of the drawing, it is seen that the auxiliary systems of a nuclear installation have liquid or gas loops into which, on the primary side, heat exchangers 1,2 are inserted for heat removal, the heat exchangers 1,2 having secondary connections 1a, 1b on the one hand; and 2a, 2b on the other hand, which are connected to cooling-liquid lines. By inserting the heat exchangers 1 and 2 into the liquid or gas loops of the auxiliary systems of a nuclear installation, an additional safety barrier is provided against the escape from the area of the nuclear installation which is secured by partitions and monitoring devices of radioactive liquid or gases that might be contained in the liquid or gas loops of the auxiliary systems.

The heat absorbed in the heat exchangers 1 and 2 from the coolant is given off to the ambient air in the dry cooling tower 8 through the cooling elements 7 by means of a closed loop.

For this purpose, cooling systems which require earthquake-proof water supplies are customarily provided so that safe heat removal from the secondary apparatus can be ensured even in the event of a failure of a supplemental water supply. In the illustrated embodiment example, this purpose is served by the dry cooling tower 8 in conjunction with a supplemental heat exchanger 11 cooled on the secondary side through a refrigeration machine and a bypass line 4.

In detail, the construction of the circuit is as follows: In the heat exchangers 1 and 2, the liquid flows from the connections 1b, 2b to the connections 1a, 2a, from where it is transported into an outgoing line 3 for the cooling liquid. The bypass line 4 is branched off from the outgoing line 3, and at the boundary 5 of the secured area, a fast-acting shut-off valve 6 is inserted into the outgoing line 3. Behind the fast-acting shut-off valve 6, the outgoing line 3 leaves the secured area and opens into the cooling elements 7 of the dry cooling tower 8. This dry cooling tower 8 is erected outdoors and can be supplied with cooling air through a blower 9 or, with appropriate construction, as a natural-draft cooling tower. The liquid leaving the cooling elements 7 of the dry cooling tower 8 then flows into the return line 10, into which the supplemental heat exchanger 11 is inserted, on the primary side thereof. The return line 10 then goes back into the secured area. In the interior of the secured area, a fast-acting shut-off valve 12 is inserted in series with a control valve 13, and the bypass line 4 which is equipped with a control valve 14, also leads into the return line 10. In the interior of the secured area, an expansion tank 16 is connected to the return line 10 over a rising line 15. Furthermore, two pumps 17 and 18 are inserted, parallel to each other and in series with check valves 19 and 20 in the return line 10 which is connected behind these check valves to the connections 1b and 2b of the heat exchangers 1 and 2. The supplemental heat exchanger 11 is constructed as an evaporator of a refrigeration loop, into which a compressor 21, a condenser 22 and a choke or throttle point 23 are inserted. Thus, the secondary side of the supplemental heat exchanger 11 constitutes a refrigeration loop which is known per se and is capable of ensuring that the required temperature for the cooling medium in the return line is maintained in operation if the air temperatures are too high. Should the power supply for the compressor 21 fail in case of an accident, the cooling loop through the outgoing line 3 and the return line 11 will continue to remain operative.

The reliable heat removal which is necessary for safety considerations is also maintained, therefore, at a higher temperature level even in the event of an accident, and even if the additional cooling of the cooling liquid through the supplemental heat exchanger fails. In order to ensure cooling of the secondary apparatus in all cases, the hereinafore-described cooling system must be provided redundantly. To reliably prevent the coolant in the dry coolant tower as well as in the outgoing and return line from freezing in the event of low temperatures, a mixture of water and glysantine, for instance, is provided as a cooling liquid. (Glysantin is a registered Trademark by BASF Aktiengesellschaft which is a German Corporation for Antifreeze Composition for Water Heating and Water Cooling). The bypass line 4 makes it possible, in connection with an appropriate action of the control valves 13 and 14, to prevent the temperature in the return line 10 at the entrance of the pumps 17 and 18 from dropping below a desired value. The compressor 21, and therefore additional cooling in the supplemental heat exchanger 11 is switched-on only when required at high air temperatures. The fast-acting shut-off valves 6 and 12 are closed if, for instance, a leak in the cooling system inside the secured area occurs, in order to limit flooding by escaping coolant.

This hereinafore-described construction thus makes it possible to ensure that cooling liquid with a constant temperature is available in operation. Excessively high temperatures of the cooling liquid are prevented in operation by a refrigeration machine; in the event of a failure of the refrigeration machine in an accident, the cooling system remains operative so as to safely remove the heat from the secondary apparatus.

We claim:

1. Cooling system for auxiliary systems of a nuclear installation for heat removal from heat exchangers, the heat exchangers being connected on the primary side thereof to lines which may contain radioactive liquids or gases, the heat exchangers being disposed within a containment wall in a secured area of the nuclear installation, and the heat exchangers having connections on the secondary side thereof for cooling liquid lines, the improvement comprising an outgoing line for the cooling liquid connected to the connection on the secondary side of the heat exchangers, additional external heat exchangers being disposed outside of the containment wall and having an inlet and an outlet side, said inlet side of said additional heat exchangers being connected to said outgoing line, a return line for the cooling liquid being connected to said outlet side of said additional heat exchangers, said additional heat exchangers being in the form of a dry cooling tower having cooling elements connected to said outgoing and return lines on the inlet and outlet sides thereof, respectively, a refrigeration loop having a supplemental heat exchanger with the primary side thereof connected in said return line, a bypass line connected from said outgoing to said return line parallel to said cooling elements and supplemental heat exchanger, and a control valve connected in said bypass line.

2. Cooling system according to claim 1, including a rising line connected to said return line in the secured area, and an expansion tank being connected to said rising line and disposed in the secured area.

3. Cooling system according to claim 1, wherein the cooling liquid is an antifreeze medium which ensures unrestrained operation of said dry cooling tower for safe heat removal from the nuclear installation.

4. Cooling system according to claim 1, wherein a plurality of redundant cooling systems are provided for one nuclear installation, said dry cooling towers of said individual cooling systems being disposed at different locations.

* * * * *